United States Patent Office 3,086,473
Patented Apr. 23, 1963

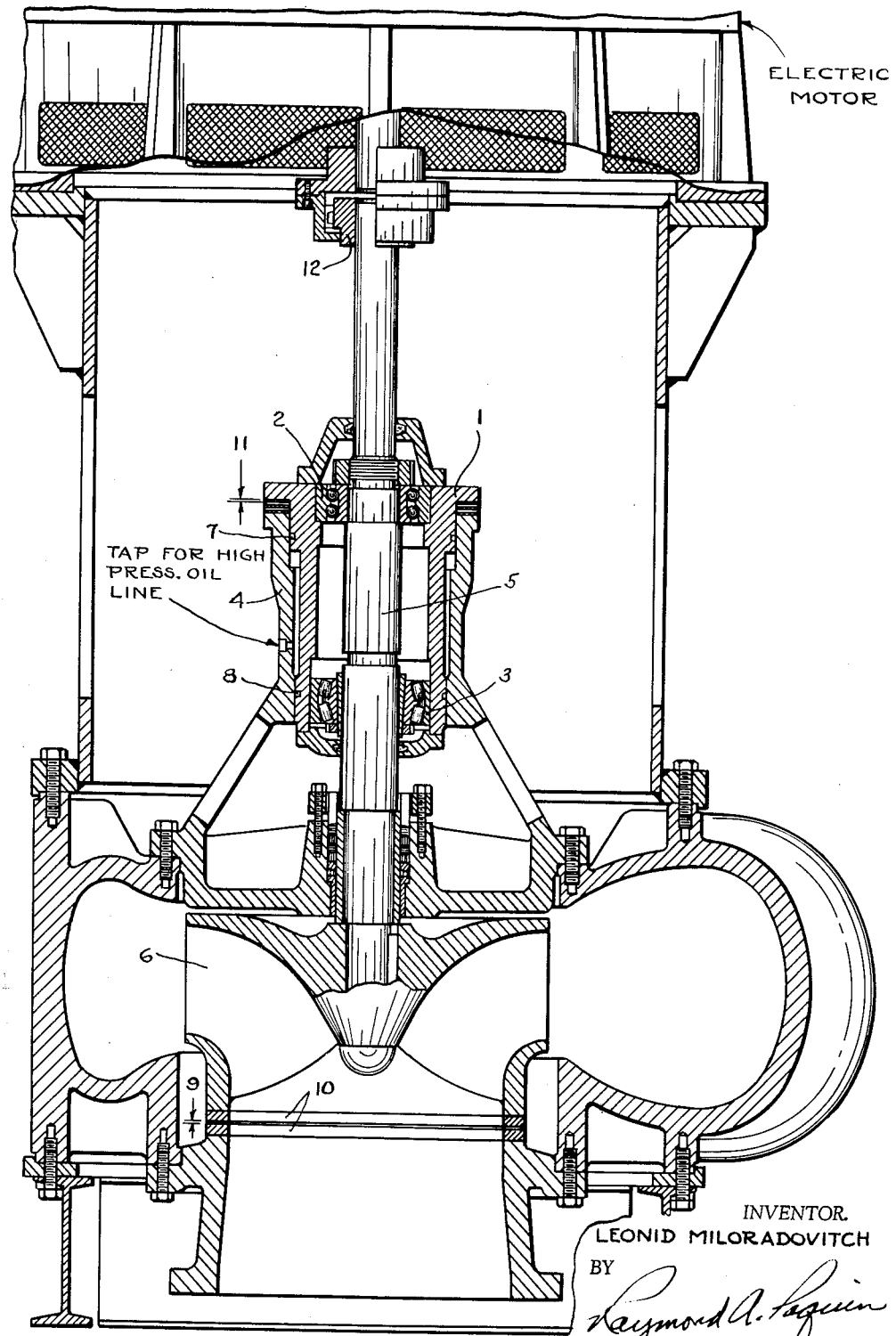

3,086,473
ADJUSTMENT OF CLEARANCES IN VERTICAL HYDRODYNAMIC MACHINES
Leonid Miloradovitch, Montreal, Quebec, Canada, assignor to Dominion Engineering Works Limited
Filed Jan. 8, 1962, Ser. No. 164,840
5 Claims. (Cl. 103—87)

This invention relates to vertical hydrodynamic machines and has particular reference to a new and improved means and method for the adjustment of clearances between the sealing rings of vertical centrifugal pumps and like machines.

The general object of this invention is to obtain simplified, accurate and fast adjustment of vertical clearances between sealing rings of hydrodynamic machines and to enable measurement of these clearances to be obtained in an easily accessible place on the outside of the machine.

In the past, clearances for machines of this type were usually obtained by one of the following arrangements:

By using small machining tolerances on the heights of parts positioned between the sealing rings and the thrust bearing. Also, for establishing exact clearances, it was additionally necessary to use gaskets of different thicknesses.

By using a hollow electric motor shaft, coaxially through which ran the pump shaft. The thrust bearing on top of the pump shaft was sitting in a so-called "thrust pot" which was threaded on the outside. The jacking action obtained by rotating the thrust pot, lifted or lowered the shaft and impeller, so adjusting the clearance between the sealing rings.

The disadvantages of the first method set forth were:

Expensive machining because of close tolerances. The expenses increase rapidly with the machine size.

Necessity of disassembling sealing flanges for each adjustment.

Uncertainty of clearances because of the gasket compression (under load) or stretching of long shafts.

Need for lifting equipment to handle the heavy components.

Need for free head above the machines to accommodate the lifting equipment.

The disadvantages of the second arrangement are as follows:

Need for special electric motors with hollow shafts.

Increase in size and price of the electric motor because of the hollow shaft.

Limitation in size of the thrust pot because of friction forces which must be overcome during adjustment.

Expensive machining i.e., the threading of heavy thrust pots and counterparts for larger machines.

Need for sufficient free space around the machine to facilitate turning the lever of the adjusting key of the thrust pot.

Need for at least two men for the adjustment process: one for measuring, one for operation of the lifting equipment.

The present invention overcomes the disadvantages and difficulties of prior art devices set forth above as follows:

The machining allowances can be generous because of the large adjustment range provided.

The disassembling of sealing flanges for the adjustment process is unnecessary.

The clearances can be controlled directly from outside, even under running conditions.

No extra head room for lifting equipment is necessary.

No lifting equipment is necessary because this feature is already built into the machine.

No necessity for special hollow shaft electric motors.

No machine size limitations are imposed by this invention.

Easy one-man operation for the adjustment process.

Other objects and advantages of the invention will be apparent from the following description taken in connection with the accompanying drawing wherein the preferred form of the invention has been shown by way of illustration only.

Referring to the drawing:

The FIGURE is a sectional view of a vertical centrifugal pump embodying the invention.

Referring more particularly to the drawing wherein similar reference characters designate corresponding parts throughout and in which a preferred form of the invention has been shown by way of illustration only, the application of the invention is shown for the special case of a vertical centrifugal pump handling abrasive fluids. A cartridge or inner housing 1 carries the thrust bearing 2 and bearing 3 for side forces. The outside diameter of the cartridge 1 is stepped, having the larger diameter on the top. The cartridge 1 is guided in the cylindrical cavity of the outer housing 4 (also stepped). When the annular spacing between 1 and 4 is filled with a fluid and pressure is applied to the fluid, a resulting force lifts the cartridge 1, together with shaft 5 and impeller 6, thereby making it possible to measure the clearance 9 between the enclosed sealing rings 10, as a clearance 11 between the open and easily accessible flanges of 1 and 4. The clearance can now be fixed in a conventional manner by shimming between the open flanges of 1 and 4. The proposed method of adjustment can also be carried out whilst the machine is running. Axial displacement of shaft 5 will not affect the driving motor 13 because of axial float permissible with coupling 12. As will be seen, inner housing 1 and outer housing 4 are in telescoping but spaced relation.

From the foregoing it will be seen that I have provided new and improved means and method for obtaining all of the objects and advantages of the invention.

I claim:

1. In a hydrodynamic machine having an impeller, a motor for driving said impeller and shaft operatively connecting said motor to said impeller, means for adjusting the position of said impeller, said means including non-rotatable inner and outer housings in telescoping relation, one of said housings being connected to the pump casing and the other of said housings being in telescoping relation with the said one of said housing, said housings being relatively adjustable and means for securing said housings in desired adjusted relation and hydraulic means for effecting relative adjustment of said housings.

2. In a hydrodynamic machine having an impeller, a motor for driving said impeller and a shaft operatively connecting said motor to said impeller, means for adjusting the position of said impeller, said means including non-rotatable inner and outer housings in telescoping relation, one of said housings being connected to the pump casing and the other of said housings being in telescoping relation with the said one of said housing, said housings being relatively adjustable and means for securing said housings in desired adjusted relation, said inner housing having bearings journalling said shaft and hydraulic means for effecting relative adjustment of said housings.

3. In a hydrodynamic machine having an impeller, a motor for driving said impeller and a shaft operatively connecting said motor to said impeller, means for adjusting the position of said impeller, said means including non-rotatable inner and outer housings in telescoping relation, one of said housings being connected to the pump casing and the other of said housings being in telescoping relation with the said one of said housing, said housings being relatively adjustable and means for securing said housings in desired adjusted relation, said outer housing being in fixed relation to the housing for said impeller and hydraulic means for effecting relative adjustment of said housings.

4. In a hydrodynamic machine having an impeller, a motor for driving said impeller and a shaft operatively connecting said motor to said impeller, means for adjusting the position of said impeller, said means including non-rotatable inner and outer housings in telescoping relation, one of said housings being connected to the pump casing and the other of said housings being in telescoping relation with the said one of said housing, said housings being relatively adjustable and means for securing said housings in desired adjusted relation, said inner and outer housings being in spaced relation and means for allowing fluid pressure to be introduced in the space between said housings for effecting relative adjustment thereof.

5. In a hydrodynamic machine having an impeller, a motor for driving said impeller and a shaft operatively connecting said motor to said impeller, means for adjusting the position of said impeller, said means including non-rotatable inner and outer housings in telescoping relation, one of said housings being connected to the pump casing and the other of said housings being in telescoping relation with the said one of said housing, said housings being relatively adjustable and means for securing said housings in desired adjusted relation, a sealed space between said inner and outer housings and means for allowing fluid pressure to be introduced in the space between said housings for effecting relative adjustment thereof.

References Cited in the file of this patent

UNITED STATES PATENTS

| | | |
|---|---|---|
| 2,435,470 | Samelson | Feb. 3, 1948 |
| 2,693,761 | Mylting | Nov. 9, 1954 |
| 2,865,299 | Hornschuch et al. | Dec. 23, 1958 |
| 2,993,448 | Garey | July 25, 1961 |
| 3,034,443 | Hinrichs et al. | May 15, 1962 |